G. E. COOKE.
ADJUSTABLE HARROW, GROUND-MARKER AND CORN-CULTIVATOR.
No. 195,486. Patented Sept. 25, 1877.
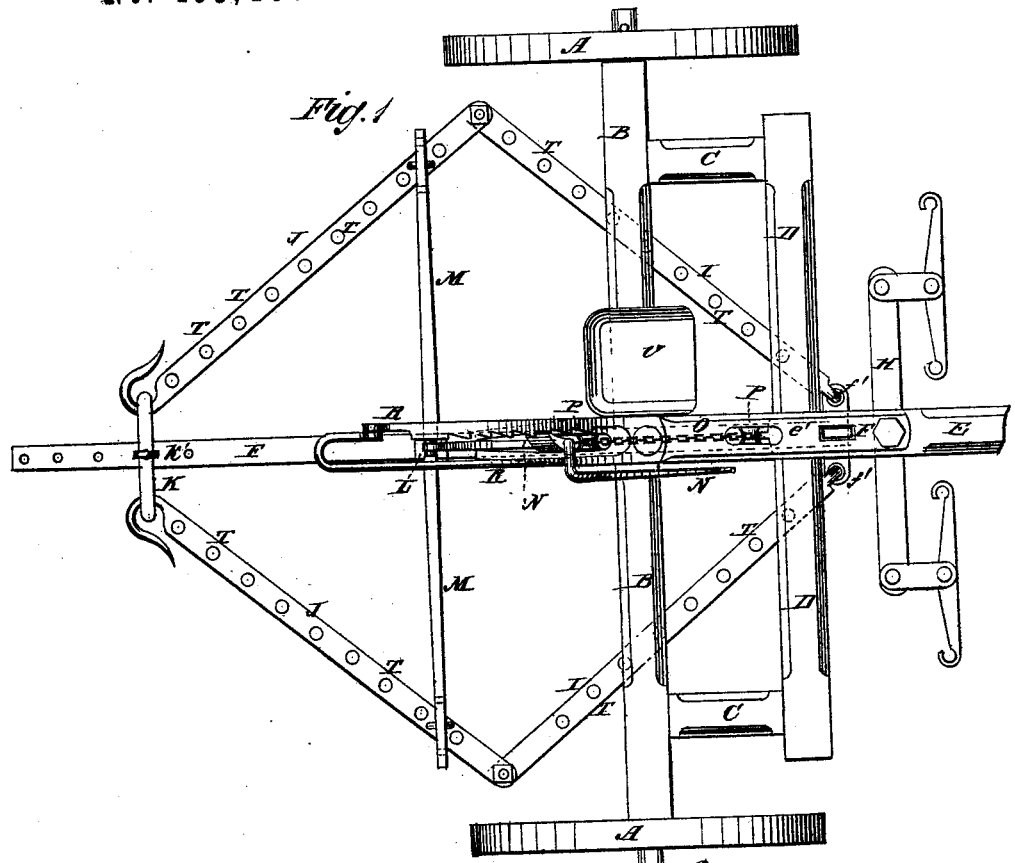
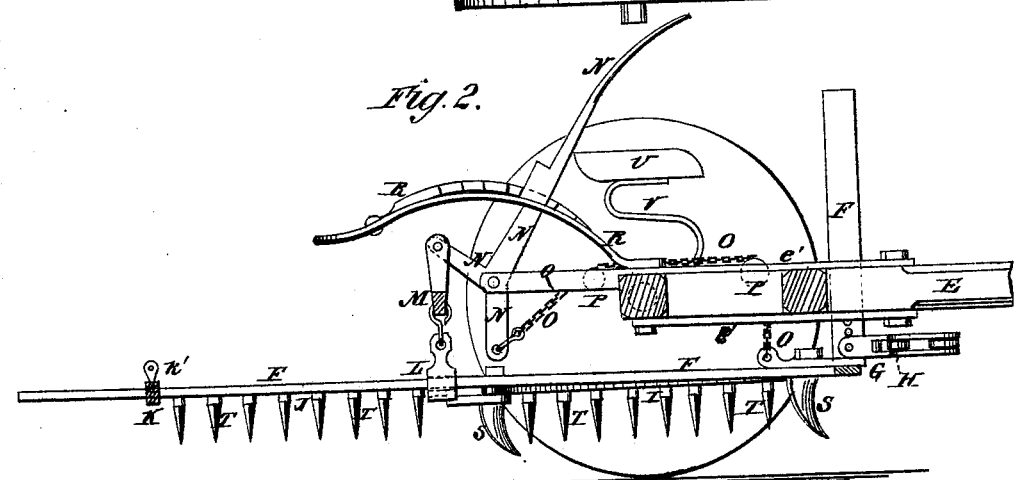

UNITED STATES PATENT OFFICE.

GEORGE E. COOKE, OF ROSSVILLE, KANSAS.

IMPROVEMENT IN ADJUSTABLE HARROW, GROUND-MARKER, AND CORN-CULTIVATOR.

Specification forming part of Letters Patent No. 195,486, dated September 25, 1877; application filed June 30, 1877.

*To all whom it may concern:*

Be it known that I, GEORGE E. COOKE, of Rossville, in the county of Shawnee and State of Kansas have invented a new and useful Improvement in Adjustable Harrow, Corn-Ground Marker, and Corn-Cultivator, of which the following is a specification:

Figure 1 is a top view of my improved machine. Fig. 2 is a vertical longitudinal section of the same.

Similar letters of reference indicate corresponding parts.

The object of this invention is to furnish an improved machine, which shall be so constructed that it may be used as an ordinary harrow for preparing the soil, for marking the ground for planting, and for cultivating small plants, and which may be adjusted to any desired width, and may be readily raised from the ground to clear it of rubbish, and for passing from place to place.

The invention will first be described in connection with the drawing, and then pointed out in the claim.

A A are the wheels, which revolve upon the journals of the axle B. To the end parts of the forward side of the axle B are attached the rear ends of two short bars, C, to the forward ends of which is attached a cross-bar, D.

E is the tongue, which is connected with the cross-bar D and axle B by metallic straps $e'$. F is a bar, the forward part of which is bent upward at right angles, and passes through a guide-hole in the tongue E just in front of the cross-bar D. If desired, the bar F may be made in two parts, bolted together at the angle.

To the upright part of the bar F, near its lower end, is attached a coupling, G, to which the double-tree H is attached, several holes being formed in the said upright part to receive the bolt that secures the coupling G to it, so that the point of draft-attachment may be adjusted higher or lower, as may be desired.

To the bar F, at its angle, is attached or upon it is formed a cross-head, $f'$, in the ends of which are formed holes to receive the hooks formed upon the forward ends of the two bars I.

To the rear ends of the bars I are pivoted the forward ends of the two bars J, the rear ends of which have hooks formed upon them to hook into holes in the ends of the cross-head K. The cross-head K has a horizontal hole formed through its center to receive the bar F, and a vertical hole to receive the pin $k'$ that passes through it and through a hole in the said bar F.

Several holes are formed in the bar F to receive the pin $k'$, so that the cross-head K can be readily moved forward or back to adjust the harrow wider or narrower, as may be desired.

L is a block, which has a hole formed through it to receive and slide upon the bar F, and to its upper end is pivoted a cross-bar, M, the ends of which are connected with the forward parts of the bars J, and to the middle part of which is pivoted the rear arm of the three-armed lever N.

To the lower arm of the three-armed lever N is attached a chain, O, which passes over guide-pulleys P pivoted to the frame-work of the machine, and its other end is attached to the bar F near its angle. The upper arm of the three-armed lever N is made long, and projects into such a position that it may be readily reached and operated by the driver from his seat.

The lever N is pivoted at its angle to the end of a rearwardly-projecting bar, Q, attached to the axle B, and its upper arm passes through a slot in the curved bar R, the forward end of which is attached to the axle B, and which is notched along its slot to hold the lever N in any position into which it may be adjusted.

By this construction, by operating the lever N the harrow may be raised and lowered and adjusted to work at any desired depth in the ground.

To the forward and side corners of the harrow-frame F I J K are attached cultivator-teeth or small plows S to mark the ground for planting corn, and which, when the machine is to be used as a harrow, may be replaced by harrow-teeth.

T T are the harrow-teeth, which are attached to the bars I J, and which may be detached when the machine is to be used as a marker, if there be much rubbish upon the ground. If the ground is free from rubbish the harrow-teeth may be left in, so that the ground may be smoothed off and marked at the same time.

U is the driver's seat, the standard V of which is attached to the axle B.

Having thus described my invention, I claim as new and desire to secure by Letters Patent—

The combination, with a vehicle, A B C D E, bent bar F, end-hooked tooth-bars I I J J, and adjustable cross-head K, of the three-armed lever N, chain O, cross-bar M, block L, and catch-bar R, all arranged to operate substantially as and for the purpose specified.

GEORGE EARL COOKE.

Witnesses:
SAMUEL KERR,
M. F. LATMAN.